United States Patent [19]

Goldenberg

[11] Patent Number: 4,978,713

[45] Date of Patent: Dec. 18, 1990

[54] POLYVINYL ALCOHOL DERIVATIVES CONTAINING PENDANT VINYLIC MONOMER REACTION PRODUCT UNITS BOUND THROUGH ETHER GROUPS AND HYDROGEL CONTACT LENSES MADE THEREFROM

[75] Inventor: Merrill Goldenberg, Teaneck, N.J.

[73] Assignee: Ciba-Geigy Corporation, Ardsley, N.Y.

[21] Appl. No.: 133,575

[22] Filed: Dec. 16, 1987

[51] Int. Cl.$^5$ .................................................. C08F 8/00
[52] U.S. Cl. .................................. 525/61; 351/160 R; 525/60
[58] Field of Search ................ 525/61, 60; 351/160 R

[56] References Cited

U.S. PATENT DOCUMENTS

| | | | |
|---|---|---|---|
| 3,408,429 | 10/1968 | Wichterle | 264/2.1 |
| 3,639,524 | 2/1972 | Selderman | 525/263 |
| 3,776,889 | 12/1973 | Pande et al. | 525/59 |
| 3,841,985 | 10/1974 | O'Driscoll et al. | 525/283 |
| 3,928,299 | 12/1975 | Rosenkranz et al. | 525/293 |
| 3,929,741 | 12/1975 | Laskey | 523/106 |
| 3,985,697 | 10/1976 | Urback | 523/106 |
| 4,085,168 | 4/1978 | Milkovich et al. | 525/59 |
| 4,347,198 | 8/1982 | Ohkada et al. | 264/2.3 |
| 4,426,492 | 1/1984 | Steckler | 525/61 |
| 4,433,179 | 2/1984 | Lohse et al. | 568/664 |
| 4,665,123 | 5/1987 | Goldenberg | 525/59 |
| 4,670,506 | 6/1987 | Goldenberg et al. | 525/59 |
| 4,720,187 | 1/1988 | Goldenberg | 351/160 R |

FOREIGN PATENT DOCUMENTS 50144793  5/1974  Japan.

OTHER PUBLICATIONS

R. Silberman et al., J. Polym. Sci., Polym. Chem. Ed., 23, 327 (1985).
Derwent Abst. 72-14674t/09.
Derwent Abst. 75-84011w/51.
R. Silberman et al., ACS Polymer Preprints 24, 262-263 and 465-466 (1983).

Primary Examiner—Joseph L. Schofer
Assistant Examiner—J. M. Reddick
Attorney, Agent, or Firm—Luther A. R. Hall

[57] ABSTRACT

A contact lens of a crosslinked, organic aprotic solvent insoluble, substantially transparent polymer of a derivative of a polyvinyl alcohol having a weight average molecular weight of at least about 2,000, containing an effective amount between about 0.1 to 90 percent, based on the number of hydroxyl groups on said polyvinyl alcohol, of a crosslinked addition reaction product of units of the formula

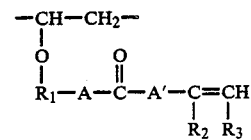

in the presence or absence of a polymerizable vinylic monomer wherein $R_1$ is a divalent aliphatic, cycloaliphatic, arylene, aralkylene, alkarylene or heterocyclic group;

A is —O—, —NH— or

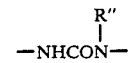

where R'' is hydrogen or lower alkyl and A' is a direct bond or A is a direct bond and A' is —O— or —O—CH$_2$—;

$R_2$ is hydrogen or methyl; and $R_3$ is hydrogen, methyl or —COOR$_4$ where R$_4$ is hydrogen or lower alkyl with the proviso that if $R_2$ is methyl, $R_3$ is hydrogen.

9 Claims, No Drawings

POLYVINYL ALCOHOL DERIVATIVES CONTAINING PENDANT VINYLIC MONOMER REACTION PRODUCT UNITS BOUND THROUGH ETHER GROUPS AND HYDROGEL CONTACT LENSES MADE THEREFROM

BACKGROUND OF THE INVENTION

The instant invention relates to polyvinyl alcohol (PVA) ether derivatives containing pendant reactive vinylic units bound to the polyvinyl alcohol backbone, through ether groups, which are optionally further reacted with a conventional vinylic monomer, and which are crosslinked to form soft hydrogel contact lenses possessing high oxygen permeability and mechanical strength and capable of being sterilized in either boiling water or dilute hydrogen peroxide solutions.

In general, most existing hydrogel soft contact lens materials are based on HEMA, also known as hydroxyethyl methacrylate or as ethylenegycol monomethacrylate, with one or more optional comonomers as described in U.S. Pat. Nos. 2,976,576, 3,841,985 and 3,985,697. Other hydrogels based on N-vinylpyrrolidone copolymers and acrylamide copolymers are disclosed in U.S. Pat. Nos. 3,639,524 and 3,929,741. These prior hydrogel polymers generally suffer from several inherent problems (a) relatively weak mechanical strength, low dissolved oxygen permeability or a combination of both (b) most lenses are made by either of two procedures, one requiring costly lathing and polishing steps and the other using delicate spin casting techniques where polymerization, crosslinking, and shaping are done simultaneously.

Polyvinyl alcohol has also been proposed as contact lens material. Several reagents have been suggested to crosslink PVA for this purpose: formalin and acid catalysis, Japanese Pat. No. 72/06910; dialdehyde of PVA with PVA and acid catalysis, Japanese Patent application No. 50/115258; and glyoxal, U.S. Pat. No. 3,408,429. These PVA crosslinked materials suffer from hydrolyzable acetal or hemiacetal linkages.

Silberman and Kohn, ACS Polymer Preprints 24, 262-3, 465-6 (1983) and J. Polym. Sci. Chem. 23, 327-336 (1985) prepared 2-benzyloxyethyl-methacrylate (BzOEMA) and graft polymerized it onto PVA by anionic and free radical catalysis. Membranes for contact lens applications were prepared by dissolving the PVA-graft-BzOEMA in dimethylsulfoxide, casting it on a Teflon surface and immersing it in acetone to precipitate a film which is later swollen in water. However such graft polymerization is generally accompanied by oxidation and degradation of the PVA and by the orientation effects in the casting procedure thereby promoting anisotropy in the mechanical properties.

Grafted PVAs have also been made by procedures that do not involve the formation of a radical on a polymer backbone. For example:

In U.S. Pat. No. 4,085,168 (1978) a PVA-graft copolymer useful as a hydrogel contact lens is made by first forming a hydrophobic macromer, such as polystyrene or polymethylmethacrylate, by an anionic mechanism and capping with a polymerizable (meth)acrylate group. This macromer is then copolymerized free radically with vinyl acetate. After hydrolysis of the acetate group a comb-like structure with a PVA backbone and pendant hydrophobic chains of similar molecular weight is produced. Though clear, transparent films can be produced by this method, the actual chemistry involves several complicated steps some of which require moisture sensitive precautions.

Also in U.S. Pat. No. 4,426,492 (1984) certain carboxylated PVA derivatives, useful as disposable, hydrogel soft contact lenses, are disclosed. It is broadly disclosed that certain carboxylated PVA derivatives may be internally plasticized by esterification with a polyglycolether such as poly(ethyleneglycol). However, esterification reactions are normally difficult to be precisely reproduced, and, in addition, mixing problems may be experienced due to phase separation of two high molecular weight polymers.

PVA has been reacted with isocyanates forming urethane linkages, for example:

In U.S. Pat. No. 3,776,889 (1973) PVA has been fully reacted with allylisocyanate for use in a photoresist printing plate composition. In U.S. Pat. No. 3,928,299 (1975), isocyanatoethyl methacrylate (IEM) was reacted with certain hydroxyalkyl methacrylate containing polymers forming a urethane linkage and the polymer used in relief printing plates or circuits to form hard insoluble coatings.

In U.S. Pat. Nos. 4,665,123 (1987) and 4 670.506 (1987) are described polyvinyl alcohol derivatives Containing pendant (meth)acryloyl units bound to the polyvinyl alcohol backbone, through urethane groups, which in the case of the former patent are further reacted with a conventional vinylic monomer, and which can be crosslinked to form soft hydrogel lenses.

PVA with ether linkages have been made, for example:

In U.S. Pat. No. 4,433,179 (1984) is described a process for the preparation of poly-allyl ethers of high degree of allylation by derivatizing polyhydroxy compounds with allyl halides under phase transfer catalysis conditions. PVA of molecular weights 2,000 and 14,000 are exemplified as being derivatized with 78% and 62% of the maximum theoretical number of double bonds.

In the European patent application No. EP-177296-A (1986) is described a process for the production of water-soluble unsaturated polymerizable methylol acrylamide derivatives of polyols. It is exemplified to form a poly (vinyl alcohol) with 49% of the hydroxy groups of the polymer substituted with acrylamidomethyl groups. However, no suggestion of contact lenses is taught or suggested.

In U.S. Pat. No. Re. 27,401 (1972) Wichterle and Lim prepared a PVA-methacrylate i.e. a PVA that was esterified 1% with methacrylic acid anhydride, dissolved the same to make a 25% aqueous solution, and polymerized the mixture in a flat mold using potassium persulfate and sodium thiosulfate as initiator to form a hydrogel membrane This type of hydrogel was disclosed for contact lens use. However, such lenses tend to be fragile.

Also in U.S. Pat. No. 4,347,198 (1982) it is disclosed to mix a hydrophilic component, e.g. N-vinyl pyrrolidone, a hydrophobic component, e.g. methyl methacrylate, crosslinking agent and initiator in a solvent, e.g. dimethyl sulfoxide and crosslink the whole mixture in a mold. After equilibration in water a soft hydrogel contact lens is produced. Similarly a lens is disclosed as produced by mixing a polymethylmethacrylate with pendant vinyl groups with N-vinyl pyrrolidone and polymerizing the mixture. It is also broadly disclosed to use a PVA esterified with methacrylic acid as the hydrophilic component of a contact lens mixture.

It is an object of the present invention to provide polyvinyl alcohol ether derivatives containing (meth)acryloyl units, which are optionally further reacted with a conventional vinylic monomer, and which then can be crosslinked to form a soft water-swellable hydrogel contact lens having high mechanical strength, medium to high water content, superior optical clarity and high oxygen permeability.

It is a further object of the present invention to provide aqueous swollen contact lenses obviating or substantially reducing the drawbacks of the prior art.

It is a further object of the present invention to provide a method of preparing such contact lenses by crosslinking such polyvinyl alcohol ether derivatives containing (meth)acryloyl units, and optionally additional vinylic monomer reaction products, in an organic aprotic solvent in a mold, such as a spin cast mold or a static cast mold, and equilibrating the resulting aprotic solvent swollen crosslinked contact lens in an aqueous medium.

DETAILED DESCRIPTION OF THE INVENTION

The instant invention provides an organic aprotic solvent insoluble polymer in the form of a substantially transparent contact lens which is a derivative of a polyvinyl alcohol having a weight average molecular weight of at least about 2,000, containing an effective amount between about 0.1 to 90 percent, based on the number of hydroxyl groups on said polyvinyl alcohol, a crosslinked addition reaction product of units of the formula I

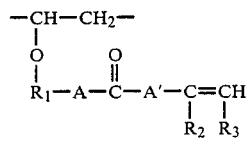

(I)

in the presence or absence of a polymerizable vinylic monomer
wherein
$R_1$ is a divalent aliphatic, cycloaliphatic, arylene, aralkylene, alkarylene or heterocyclic group;
A is —O—, —NH— or

where R'' is hydrogen or lower alkyl and A' is a direct bond or A is a direct bond and A' is —O— or —O—CH$_2$—;
$R_2$ is hydrogen or methyl; and
$R_3$ is hydrogen, methyl or —COOR$_4$ where R$_4$ is hydrogen or lower alkyl with the proviso that if R$_2$ is methyl, R$_3$ is hydrogen.

Where $R_1$ is a divalent aliphatic group it is preferably straight or branched chain alkylene of 1 to 20 carbon atoms, or straight or branched chain alkylene of 2 to about 100 carbon atoms interrupted by one or more hetero atoms, such as carbonyloxy, sulfonamido, carbonamido, sulfonyl, sulfoxy, or preferably oxy, and is further unsubstituted or substituted by hydroxy. Advantageously, where alkylene is greater than about 10 carbon atoms, the number of hetero atoms present is at least one per each 10 carbon atoms. One preferred subembodiment includes for example alkoxylated divalent groups such as —R$^a$—O—(R$^b$—O)$_n$—R$^c$— wherein R$^a$ and R$^c$ are independently alkylene of 2 up to 8 carbon atoms, unsubstituted or substituted by hydroxy and R$^b$ is lower alkylene of two to four carbon atoms and n is 1 to about 20.

Where $R_1$ is alkylene, it may be straight or branched chain, more preferably 2 to 10 carbon atoms which is unsubstituted or substituted by hydroxy. Suitable examples include ethylene, propylene or hydroxy substituted propylene. Where $R_1$ is arylene, it is preferably phenylene which is unsubstituted or substituted by lower alkyl or lower alkoxy, and more preferably 1,3- or 1,4-phenylene. It may also be heteroaromatic. Where $R_1$ is a saturated cycloaliphatic divalent group, such group preferably is cyclohexylene or cyclohexylmethylene which is unsubstituted or substituted by one or more methyl groups. Where $R_1$ is aralkylene, the aryl moiety thereof is preferably phenylene which is unsubstituted or substituted by lower alkyl or lower alkoxy and the alkylene moiety thereof is preferably lower alkylene, such as methylene or ethylene.

The polyvinyl alcohol polymer derivatives containing units of formula I are easily prepared by reacting a polyvinyl alcohol, having a weight average molecular weight of at least about 2,000, containing for example units of the formula $$-CH-CH_2- \atop | \atop OH \qquad (II)$$

with about 0.1 to about 90 percent, based upon the number of hydroxyl groups in said polyvinyl alcohol, of a hydroxyl reactive monomer of the formula

(III)

wherein A A', $R_2$ and $R_3$ are as above defined and $R_1'$ comprises hydroxyl reactive moieties such as epoxy, halo, vinyl sulfone, α-halo carbonyl, hydroxyl, such that $R_1$ is the residue of the reaction product, at a temperature between about −10° C. to about 150° C. optionally in the presence of a conventional solvent, preferably an aprotic solvent, in the further presence or absence of a catalytic amount of acid or basic catalyst.

To obtain those polyvinyl alcohol polymer derivatives containing units of formula I wherein $R_4$ is hydrogen, the corresponding polymers wherein $R_4$ is lower alkyl can subsequently be treated with aqueous base, such as an alkali metal hydroxide aqueous solution, at an elevated temperature e.g. between about 40° to about 80° C., followed by neutralization of the resulting carboxylate salt with an acid, such as aqueous hydrochloric acid under ambient conditions.

Suitable aprotic solvents for conducting the reaction between the units of formula II and the hydroxyl reactive moiety of formula III include formamide, dimethyl formamide, phosphoric acid tri-dimethylamide, N-methyl-2-pyrrolidone, dimethylacetamide, acetamide, acetonitrile and preferably dimethyl sulfoxide.

For certain reactants aqueous or aqueous/organic solvents may be used.

Suitable catalysts can be either Lewis bases or Lewis acids. Preferably the catalyst is an organic base such as tertiary amines for example trimethylamine, triethylamine, N,N-dimethylbenzylamine and in aqueous solvent systems inorganic bases such as sodium or potassium hydroxide can be used as well as other bases such as tetrabutylammonium fluoride or sodium acetate. Suitable acid catalysts can include fluoroboric acid, zinc fluoroborate, zinc chloride, aluminum chloride, hydrochloric, nitric and sulfuric acids—or Lewis acid adducts such as boron trifluoride etherate or organo-metallic compounds such as dibutyltin dilaurate. Where $R_1'$ contains a hydroxyl groups as the reactive functionality an acid catalyst is preferred.

Polyvinyl alcohols containing units of the formula II are widely available.

Preferably, the polyvinyl alcohol has a weight average molecular weight of at least 10,000.

As an upper limit, the polyvinyl alcohol may have a weight average molecular weight of up to 1,000,000. Preferably, the polyvinyl alcohol has a weight average molecular weight of up to 300,000, more preferably up to 100,000, most preferably up to 50,000.

Ordinarily, polyvinyl alcohol predominately possesses a poly(2-hydroxy)ethylene structure. However the polyvinyl alcohol starting material may also contain hydroxyl groups in the form of 1,2-glycols, such as copolymer units of 1,2-dihydroxyethylene in the chain, obtained for example, by alkaline hydrolysis of vinyl acetate-vinylene carbonate copolymers.

Moreover, the polyvinyl alcohol may contain minor amounts of copolymer units of ethylene, propylene, acrylamide, methacrylamide, dimethylacrylamide, hydroxyethyl methacrylate, methyl methacrylate, methyl acrylate, ethyl acrylate, vinyl pyrrolidone, hydroxyethyl acrylate, allyl alcohol, styrene and the like.

Commercial polyvinyl alcohol resin may be used such as Vinol® 107 manufactured by Air Products (MW=22-31,00, 98-98.8% hydrolyzed). Polysciences 4397 (MW=25,000, 98.5% hydrolyzed), BF 14 by Chan Chun, Elvanol® 90-50 by Dupont, UF-120 by Unitika, Mowiol® 10-98 and 20-98 by Hoechst. Some other manufacturers are Nippon Gohsei (Gohsenol®), Monsanto (Gelvatol®), Wacker (Polyviol®) as well as the Japanese manufacturers Kuraray, Denki and Shin-Etsu.

As noted above, copolymers of hydrolyzed vinyl acetate can be used and are commercially available such as hydrolyzed ethylene vinyl acetate (EVA), vinyl chloride-vinylacetate, N-vinyl pyrrolidone-vinyl acetate and maleic anhydride-vinyl acetate.

Polyvinyl alcohol is ordinarily prepared by hydrolysis of the corresponding homopolymeric polyvinyl acetate. In a preferred embodiment the polyvinyl alcohol contains less than 50% polyvinyl acetate units, more preferably less than 20% polyvinyl acetate units.

One method of roughly estimating the weight average molecular weight of polyvinyl alcohol is by the viscosity of a 4% aqueous solution at 20° C.: for example a viscosity of 1-2 cP corresponds to a molecular weight of ~3,000, a viscosity of 7 cP corresponds to a molecular weight of ~25,000 (98-100% hydrolyzed) while a viscosity of 60 cP corresponds to a molecular weight of ~130,000 (99—100% hydrolyzed). Preferably the polyvinyl alcohol should have a minimum viscosity of 2 cP and the upper limit of molecular weight is dictated by the ability to stir and pour solutions without introduction of air bubbles—this value is approximately 60-70 cP. It is important to note that the manufacturers' claim of molecular weight (based on viscosity data) does not necessarily correspond to that obtained by gel permeation chromatography (GPC) which is dependent on the standards used. In Table 1 are presented a range of polyvinyl alcohols and the GPC results determined using polyacrylamide standards in aqueous solution.

The weight average molecular weight ranges specified in this disclosure are those obtained by GPC using polyacrylamide standards in aqueous solution.

The hydroxyl reactive compounds of formula III are known, per se, or are easily prepared by conventional methods well known in the art.

TABLE 1

PVA MOLECULAR WEIGHT COMPARISON

| Manufacturer | Manufacturers' Claimed $M_w$ | Viscosity, CPS* | GPC, $M_w$ |
|---|---|---|---|
| Polysciences | 133,000 | — | 66,000 |
| Scientific Polymer Products | 126,000 | 60 | 45,000 |
| Scientific Polymer Products | 115,000 | — | 69,000 |
| Shin-Etsu Poval C25 | 110,000 | 65 ± 5 | 38,000 |
| Air Products Vinol 350 | 106–110,000 | 55–65 | 43,000 |
| Hoechst, Moviol 66-100 | 100,000+ | 66 ± 4 | 26,000 |
| DuPont, Elvanol HV | 100,000+ | 55–65 | 50,000 |
| Polysciences | 78,000 | 28–32 | 37,000 |
| Sigma | 45,000 | 12–14 | 30,000 |
| Polysciences | 25,000 | 6–8 | 20,000 |
| Aldrich | 14,000 | — | 33,000 |
| Scientific Polymer Products | 14,000 | — | 22,000 |

*4% aqueous solutions at 20° C.

Where, in the compounds of formula III, $R_1'$ contains a glycidyl group these may be prepared from an active hydrogen containing e.g. hydroxy precursor reacting with epichlorohydrin and optionally basic catalyst between about 0° C. and 100° C. in the presence or absence of an inert solvent. Suitable solvents include ethyl acetate, tetrahydrofuran, dimethylformamide and the like. An epoxy containing R' may also be prepared from an olefin-containing precursor reacting with a peracid such as m-chloroperbenzoic acid in an inert solvent such as methylene chloride at about room temperature.

Oxirane compounds may also be formed from the reaction of polyoxirane compounds with active hydrogen monomers leaving at least one oxirane moiety unreacted. A list of possible polyoxiranes may be found in U.S. Pat. No. 4,598,122 Col. 4–7. For example, in the case of a di-oxirane e.g. 1,4-butane diol diglycidyl ether a substantially equimolar amount of hydroxyethyl methacrylate can be used under basic conditions.

Also oxirane containing monomers can be formed from the reaction product of an active hydrogen containing oxirane e.g. glycidol with isocyanate containing monomers e.g. see U.S Pat No 4,665,123, col. 4, formula III.

Other hydroxy reactive monomers of formula III as described above, e.g. halo, can be formed by a similar synthetic route e.g. reacting a halo alcohol, such as chloroethanol with an isocyanate-containing monomer at a temperature between about 0° C. to about 100° C. in the presence or absence of an inert diluent, desirably in the presence of a conventional urethane catalyst such as stannous octoate or triethylamine and the like.

Preferred oxirane containing compounds include glycidyl methacrylate and glycidyl acrylate.

Where, in the compounds of formula III, $R_1'$ contains a vinyl sulfone these may be prepared from an active hydrogen (e.g. hydroxyl group) containing precursor reacted with divinyl sulfone.

The divinyl sulfone precursor reaction is run under similar conditions as previously described for a polyoxirane precursor.

Where, in the compounds of formula III, $R_1'$ contains a reactive halo group, these can be formed from the corresponding alcohol by methods well known in the art. Another useful halo compound is the reaction product of an alcohol monomer with cyanuric chloride prepared preferably at low temperature i.e. 0–10° C. to obtain a monoadduct. Preferred halo compounds are vinyl chloroacetate, allyl chloroacetate and 2-chloroethyl methacrylate.

As an alternate method to form an ether-linked PVA one can react the starting polyvinyl alcohol of formula (II) by known etherification reactions e.g. ethoxylation with, for example, an alkylene oxide preferably of 2 to 4 carbon atoms to form the corresponding alkoxylated polyvinyl alcohol, or cyanoethylation to form the corresponding 2-cyanoethyl ether derivative of polyvinyl alcohol, or carbamoylethylation to form the corresponding 2-amidoethylether (as see C. A. Finch, Polyvinyl Alcohol, John Wiley Sons, New York, 1973, Ch. 9) followed by adduction with a coreactive group of a vinylic monomer. The etherification reactions can be done in aqueous, organic or aqueous/organic solvents, preferably aqueous, using basic catalysis (e.g. sodium hydroxide or triethylamine) at about 0° C. to 100° C. Isocyanate, oxirane, alkyl halide, acid chloride, acid and ester groups for example are coreactive with hydroxyl or amino groups. Hydroxyl groups are also coreactive with each other under acid catalysis forming ether linkages. In the case of carbamoylethylation or cyanoethylation (after hydrolysis) an amino-polyvinyl alcohol can be formed under conventional reaction conditions. After carbamoylethylation or hydrolysis of the cyano group, the amide group can be converted to an amine by reaction with an alkali metal hypohalite (e.g. sodium hypochlorite) in aqueous or aqueous/organic solvents at 0° C. to about 50°. After cyanoethylation, the cyano group can be hydrolyzed to the amide under aqueous acid (e.g. sulfuric) catalysis at 0° C. to about 100° C.

The polymerizable vinylic monomer may be hydrophilic, hydrophobic or may be a mixture of hydrophilic and hydrophobic vinylic monomers. Suitable vinylic monomers include those conventional vinylic monomers generally employed in the fabrication of soft and hard contact lenses. By a hydrophilic vinylic monomer is meant a monomer which, when polymerized by conventional free radical polymerization, characteristically yields a polymer which either dissolves in water or is capable of absorbing at least 10% by weight water under ambient equilibrium conditions. Similarly, suitable hydrophobic vinylic monomers are those monomers which, when polymerized by conventional free radical polymerization, characteristically yield a polymer which neither dissolves in water, nor is capable of absorbing at least 10% by weight water under ambient (i.e. 20° C.) equilibrium conditions.

In general, when the optional polymerizable monomer is present, between about 0.01 and about 80 units of conventional hydrophobic and/or hydrophilic monomer is reacted per unit of formula I.

The polymers of the instant invention preferably contain at least about 0.1 to about 90 percent, more preferably at least about 1.5 to 90 percent, based on the number of hydroxyl groups on the polyvinyl alcohol, of units of formula I, which are reacted with 0.01 to about 80 units of conventional monomers.

In one preferred sub-embodiment of the instant invention, the polyvinyl alcohol derivative contains at least about 0.1 to about 20, preferably between about 1.5 to about 20 percent, based upon the number of hydroxyl groups on said polyvinyl alcohol of units of formula I, which are reacted with 0.01 to 80 units of a vinylic monomer per unit of formula I, more preferably between about 0.5 to about 30 units of vinylic monomer per unit of formula I, and most preferably between about 2 to about 20 units of vinylic monomer per unit of formula I present in the polyvinyl alcohol polymer. In this preferred sub-embodiment it is generally desirable to employ a hydrophobic vinylic monomer as the monomer reactant, or alternatively, a mixture of hydrophobic and hydrophilic monomers containing at least 50 weight percent of hydrophobic monomer, based upon total monomer reactant, is employed. The added hydrophobic monomer or monomer mixture containing predominantly hydrophobic monomer has been found to increase the mechanical strength of the ultimate final product soft contact lens material, to reduce in a generally predictable manner the amount of water contained in the contact lens material, and reduce the pore size of the contact lens material, thereby reducing the rate of accumulation of proteinaceous and non-proteinaceous debris associated with the normal day to day wearing and handling of contact lenses. Surprisingly, and most unexpectedly, the introduction of hydrophobic monomer, or monomer mixture containing at least 50 mole percent hydrophobic monomer, to the hydrophilic polyvinyl alcohol containing units of formula I does not, upon reaction, result in phase separation of the reaction product Rather, the product is optically clear, indicating substantially no phase separation.

In an alternate preferred sub-embodiment of the instant invention, the polyvinyl alcohol derivative contains between about 20 to about 50 percent of units of the formula I, based upon said polyvinyl alcohol, which are reacted with about 0.01 to about 20, more preferably with about 0.01 to about 10, most preferably with about 0.05 to about 5 units of vinylic monomer, per unit of formula I present in the polyvinyl alcohol. In this alternate sub-embodiment, the vinylic monomer is hydrophobic or a mixture of hydrophobic monomer and hydrophilic monomer units, wherein up to about 80 weight percent of the total vinylic monomer is hydrophilic. The incorporation of the hydrophilic vinylic monomer component tends to increase the water content, surface wettability and oxygen permeability of the resultant contact lenses. In this embodiment, it is most preferred to employ between about 10 to about 80 weight percent hydrophilic monomer based upon total added Vinylic monomer for optimum results.

In a third sub-embodiment, the polyvinyl alcohol derivative contains between about 50 to about 90 percent of units of formula I, based upon said polyvinyl alcohol, which are reacted with about 0.01 to about 20, more preferably with about 0.01 to about 10, most preferably with about 0.05 to about 5 units of vinylic monomer, per unit of formula I present in the polyvinyl alcohol. In this third sub-embodiment it has been found advantageous to employ, as vinylic monomer, a hydrophilic vinylic monomer, or a mixture of hydrophilic and hydrophobic vinylic monomer wherein the hydrophilic component is predominant, i.e. wherein at least 50 percent by weight of total vinylic monomer employed is hydrophilic. In this embodiment, it is most preferred to employ a hydrophilic monomer or a monomer mixture containing between at least 50 percent to about 99 percent by weight hydrophilic monomer, for optimum results.

As is evident from the above three preferred sub-embodiments, as the percent of formula I units increase from about 0.1% to about 90%, based upon the hydroxyl units in the polyvinyl alcohol, the added vinylic monomer reacted therewith is generally increasingly hydrophilic in character for an optimum balance of performance characteristics, in terms of mechanical strength, water content, surface wettability and oxygen permeability.

The vinylic monomers are reacted with the polyvinyl alcohol derivative of formula I advantageously in the presence of an inert diluent or solvent, such as a suitable organic solvent, including a lower alkanol, e g. ethanol, methanol or the like, or an aprotic solvent such as dimethylformamide, acetamide, acetonitrile, dimethylacetamide, dimethylsulfoxide or mixtures thereof. Also, aqueous/organic solvent systems may be employed. Preferred is dimethylsulfoxide.

The vinylic monomer, or blend of vinylic monomers, are optionally combined with the polyvinyl alcohol derivative of formula I and polymerized in the presence of actinic radiation or in the presence of a conventional free radical initiator, such as a peroxide, e.g. di-tert-butyl peroxide, benzoyl peroxide, lauryl peroxide, decanoyl peroxide, acetyl peroxide, succinic acid peroxide, methyl ethyl ketone peroxide, 2,4-dichlorobenzoyl peroxide, isopropyl peroctoate, tert-butyl hydroperoxide, tert-butyl perpivalate, tert-butyl peroctoate, diisopropyl peroxydicarbonate, cumene hydroperoxide, tert-butyl perbenzoate, tert-butyl peroxymaleic acid, tert-butyl-peroxy-acetate, and potassium persulfate, an azo compound e.g. 2,2-azo-bis-isobutyronitrile, 2,2'-azo-bis-(2,4-dimethylvaleronitrile), 1,1'-azo-bis-(cyclohexane carbonitrile),2,2'-azo-bis(2,4-dimethyl-4-methoxyvaleronitrile) and phenyl azo isobutyronitrile, a photoinitiator, e.g. benzoin methyl ether and 1-hydroxycyclohexyl-phenyl ketone or actinic radiation such as UV light or ionizing rays e.g. gamma rays or x-rays, to form the resulting crosslinked polymer.

The polyvinyl alcohol derivative of formula I and optionally added monomer is advantageously polymerized upon placement into a mold. The mold may be a conventional spin-casting mold for preparing contact lenses such as described in U.S. Pat. No. 3,408,429, or in a static mold, e.g. as described in U.S. Pat. No. 4,347,198. Alternately, one may prepare a swollen lens blank, dry the lens blank to form the corresponding xerogel, shape the xerogel into a contact lens precursor by lathing methods known to the art, and swell the shaped xerogel in aqueous medium to form the corresponding contact lens, as described in Reissue U.S. Pat. No. 27,401.

The solution of polyvinyl alcohol derivative of formula I and optionally added vinylic monomer are advantageously placed into a mold in shape of a contact lens. Where the solvent employed is a strong swelling solvent, such that the resultant polymer shrinks in size upon equilibration with aqueous or aqueous saline solution, typically between about 10 to about 35 percent based on diameter, the mold is suitably enlarged to compensate for the post treatment shrinkage. Optimally the post treatment further includes a heat treatment of the molded lens shaped polymer. Such heat treatment is characteristically conducted at a temperature between about 60° to 100° C., e.g. in the presence of an aqueous medium. This treatment may result in a further slight shrinkage, generally less than 15% based on diameter. The treatment can vary greatly, but usually is accomplished in about 5 to 90 minutes. The purpose of this post treatment is to dimensionally stabilize the crosslinked contact lens material. Also, the treatment may further serve to sterilize lens material.

Suitable vinylic monomers for polymerization with the polyvinyl alcohol derivative of formula I include conventional hydrophobic and hydrophilic monomers. Suitable hydrophobic monomers include, without limitation, $C_1$ to $C_{18}$ alkyl acrylates and methacrylate, $C_3$ to $C_{18}$ alkyl acrylamides and methacrylamides, acrylonitrile, methacrylonitrile, vinyl $C_1$ to $C_{18}$ alkanoates, $C_2$ to $C_{18}$ alkenes, $C_2$ to $C_{18}$ haloalkenes, styrene, $C_1$ to $C_6$ alkyl styrenes, vinyl alkyl ethers wherein the alkyl portion has 1 to 6 carbon atoms, $C_3$–$C_{12}$ perfluoroalkyl ethyl thiocarbonylaminoethyl acrylates and methacrylates, $C_3$–$C_{12}$ fluoroalkyl acrylates and methacrylates, acryloxy and methacryloxy alkyl siloxanes, N-vinyl carbazole, $C_1$–$C_{12}$ alkyl esters of maleic, fumaric, itaconic, and mesaconic acids and the like. Examples of suitable hydrophobic monomers include methyl acrylate, ethyl acrylate, propyl acrylate, isopropyl acrylate, cyclohexyl acrylate, 2-ethylhexyl acrylate, methyl methacrylate, propyl methacrylate, vinyl acetate, vinyl propionate, vinyl butyrate, vinyl valerate, styrene, chloroprene, vinyl chloride, vinylidine chloride, acrylonitrile, 1-butene, butadiene, methacrylonitrile, vinyl toluene, vinyl ethyl ether, perfluorohexylethylthiocarbonylaminoethyl methacrylate, isobornyl methacrylate, hexafluorobutyl methacrylate, 3-methacryloxypropyl-pentamethyldisiloxane, and bis(methacryloxypropyl) tetramethyldisiloxane.

Suitable hydrophilic monomers include, without limitation, hydroxy substituted lower alkyl acrylates and methacrylates, acrylamide, methacrylamide, $C_1$–$C_2$ lower alkyl acrylamide and methacrylamide, ethoxylated acrylates and methacrylatas, hydroxy substituted lower alkyl acrylamide and methacrylamide, hydroxy substituted lower alkyl vinyl ethers, sodium ethylene sulfonate, sodium styrene sulfonate, 2-acrylamido-2-methylpropanesulfonic acid, N-vinylpyrrole, N-vinyl-succinimide, N-vinyl pyrrolidone, 2-and 4-vinyl pyridine, acrylic acid, methacrylic acid, amino (by amino including quaternary ammonium), monoloweralkylamino- or diloweralkylaminolower alkyl acrylates or methacrylates, allyl alcohol, and the like.

Specific hydrophilic monomers include hydroxyethyl methacrylate, hydroxyethyl acrylate, acrylamide, methacrylamide, dimethylacrylamide, allyl alcohol, vinyl pyridine, vinyl pyrrolidone glycerol methacrylate, N-(1,1-dimethyl-3-oxobutyl) acrylamide, and the like.

Preferred hydrophobic monomers are methyl methacrylate and vinyl acetate.

Preferred hydrophilic monomers are 2-hydroxyethyl methacrylate, N-vinyl pyrrolidone, acrylamide, and dimethyl acrylamide.

Optionally, an additional conventional polyreactive crosslinking agent may be added, such as, allyl compounds e.g. allyl methacrylate, diallyl itaconate, monoallyl itaconate, diallyl maleate, diallyl fumarate, diallyl succinate, diallyl phthalate, triallyl cyanurate, triallyl isocyanurate, diethylene glycol bis-allyl carbonate, triallyl phosphate, triallyl trimellitate, allyl ether, N,N- diallylmelamine; vinyl compounds, e.g. divinyl benzene, N,N'-methylene bis acrylamide, ethylene glycol dimethacrylate, neopentylglycol dimethacrylate, tetraethylene glycol dimethacrylate, hexamethylene bis maleimide, divinyl urea, bisphenol A bis methacrylate divinyl adipate, glycerin trimethacrylate, trimethylolpropane triacrylate, trivinyl trimellitate, 1,5-pentadiene, 1,3-bis(4-methacryloxybutyl) tetramethyl disiloxane, divinyl ether and divinyl sulfone; hydroxyl reactive compounds such as: polyvalent isocyanates e.g. hexamethylene diiscyanate, isophorone diisocyanate, toluene diisocyanate, polyaldehydes e.g. glutaraldehyde and glyoxal; polyacids e.g glutaric acid and oxalic acid; polyepoxides e.g. butane diepoxide, vinylcyclohexane dioxide and butanediol diglycidyl ether, polyols (acid catalysis) e.g. dimethylol urea and diethylene glycol.

When employed, about 0.01 to 10 weight percent of crosslinking agent, based upon the weight of formula I derivative, may be present, preferably about 0.01 to about 5 percent, most preferably about 0.05 to 2 weight percent.

The resultant contact lenses are optically clear, strong, flexible, highly oxygen permeable and wettable. Further, the instant lenses are characterized by their ease of manufacture.

In the following examples, all parts are by weight unless otherwise described.

The following example illustrates a range of water contents obtained using different levels of glycidyl methacrylate (GMA) with a polyvinyl alcohol (PVA).

EXAMPLE 1

3 g Air Products Vinol® 107 (MW=22-31,000, 98-98.8% hydrolyzed) is dissolved in 27 g Aldrich Gold Label (99.9%) DMSO under house nitrogen at 60° C. (approximately 0.5 hour) in a three-neck round bottom flask with overhead stirring. The solution is then allowed to cool to room temperature. Then, in the case of sample 10, 0.195 g (9.98 mole % with respect to vinyl alcohol assuming 100% hydrolyzed PVA) distilled glycidyl methacrylate (GMA) (Pfaltz & Bauer) is added to 6.062 g of the PVA solution followed by adding 0.0162 g (0.26 wt % with respect to total reaction mixture) triethylamine (TEA). This solution is allowed to react at 60° C for 3 hours with magnetic stirring and then allowed to cool to room temperature. Then, 0.0067 g (0 11 wt % with respect to total reaction mixture) of the initiator benzoin methyl ether (BME) is added, the solution mixed well, poured into flat "sandwich" molds and polymerized with UV light (360 nm) at room temperature for four hours.

The polymerized films are removed from the molds and extracted successively in 75%, 50%, 25%, 0% DMSO/water solutions. The films are boiled in water for 10 minutes before % $H_2O$ content is determined. The other samples are prepared in a similar manner except for the amount of GMA added and, for samples 1 and 2, the irradiation time (9.5 hours).

| Sample # | Mole % GMA | % TEA | % $H_2O$ Content | Observation After Irradiation, Water Equilibration & Boiling |
|---|---|---|---|---|
| 1 | 1.69 | 0.20 | — | Film: elastic, weak, clear, colorless |
| 2 | 1.96 | 0.23 | — | Film: elastic, weak, clear, colorless |
| 3 | 2.10 | 0.22 | 91.17 | Film: clear, colorless |
| 4 | 2.23 | 0.21 | 93.72 | Film: clear, colorless, brittle |
| 5 | 4.96 | 0.29 | 88.43 | Film: clear, colorless, very brittle |
| 6 | 5.00 | 0.20 | 81.89 | Film: clear, colorless, brittle |
| 7 | 5.22 | 0.44 | 81.15 | Film: clear, colorless (yellow when viewed through edge), weak |
| 8 | 7.22 | 0.26 | 76.69 | Film: clear, colorless, brittle |
| 9 | 7.33 | 0.21 | 75.38 | Film: clear, colorless (yellow when viewed through edge) |
| 10 | 9.98 | 0.26 | 68.04 | Film: clear, colorless yellow when viewed through edge) |

As shown above, those sheets with a low mole % GMA (<2%) are clear, colorless, weak and elastic. Sheets with approximately 2 mole % GMA are stronger than the low mole % GMA sheets and are clear and colorless. Above 5 mole %, the sheets are clear and colorless but appear slightly yellow when viewed through the edge.

Water contents of these sheets range from 92% for a 2 mole % GMA solution to 68% for a 9.98 mole % GMA solution.

The following example shows the effect of temperature on the PVA/GMA reaction. The solutions are prepared in a similar manner to that in Example 1 with 10 mole % GMA and 0.2% by weight triethylamine.

EXAMPLE 2

| Sample # | Mole % GMA | Temperature (°C.) | % TEA | % $H_2O$ Content | Observation After Irradiation Water Equilibration & Boiling |
|---|---|---|---|---|---|
| 1 | 10.01 | 22 | 0.24 | — | did not polymerize, solution clear |
| 2 | 10.28 | 30 | 0.26 | — | did not polymerize, solution clear |
| 3 | 10.26 | 40 | 0.29 | — | Film: very brittle, yellowish |
| 4 | 10.78 | 50 | 0.22 | 68.32 | Film: yellow, slightly brittle |
| 5 | 10.09 | 60 | 0.28 | 71.92 | Film: yellow, brittle |
| 6 | 10.07 | 70 | 0.28 | 78.04 | Film: very yellow, brittle |

As shown above, it is necessary to attain a temperature of at least 40° C. at this level GMA and TEA catalyst for sufficient adduction to the place that can lead to polymerization to a film. At temperatures below 40° C. the solution remains clear but does not polymerize. At temperatures between 40° C. and 70° C. the solutions polymerize but the films are increasingly yellow with increase in temperature.

The following example shows the effect of temperature and catalyst level on the PVA/GMA reaction using low mole % GMA. The solutions are prepared in a similar manner to that in Example 1 with approximately 1 mole % GMA.

EXAMPLE 3

| Sample # | Mole % GMA | % TEA | Temperature (°C.) | Observation After Irradiation, Water Equilibration & Boiling |
|---|---|---|---|---|
| 1 | 0.94 | 0.50 | 60 | did not polymerize, clear solution |
| 2 | 1.04 | 0.84 | 60 | Film: clear, elastic, sticky, weak |
| 3 | 0.99 | 1.01 | 60 | did not polymerize, clear solution |
| 4 | 1.34 | 0.20 | 60 | Film: not fully polymerized, clear, elastic, sticky |
| 5 | 0.98 | 0.19 | 80 | Film: more polymerized than #4, clear, elastic, sticky |
| 6 | 1.15 | 0.22 | 100 | Film: clear, yellow |
| 7 | 1.22 | 0.21 | 120 | Film: clear, dark yellow, elastic |

As shown above, at 60° C. a polymerized sheet is obtained with 0.84% TEA (sample #2) but not with 0.5 and 1.01% TEA (samples 1 and 3). Varying the adduction reaction temperature from 60° C. to 120° C. results in partially polymerized solutions at 80° C. to fully polymerized dark yellow sheets at 120° C.

The following example shows the effect of heating time and catalyst level on the PVA/GMA reaction. The solutions are prepared in a similar manner to that in Example 1 with approximately 10 mole % GMA at 60° C.

EXAMPLE 4

| Sample # | Mole % GMA | Time Heated | % TEA | % H$_2$O Content | Observation After Irradiation, Water Equilibration & Boiling |
|---|---|---|---|---|---|
| 1 | 9.84 | 15 min | 0.33 | — | did not polymerize, yellow solution |
| 2 | 10.50 | 30 min | 0.27 | — | Film: clear, yellow, very brittle |
| 3 | 9.89 | 1 h | 0.28 | — | Film: clear, yellow, brittle |
| 4 | 9.98 | 2 h | 0.25 | 69.45 | Film: clear, colorless (yellow when viewed through edge) |
| 5 | 10.40 | 3 h | 0.21 | 71.76 | Film: clear, colorless (yellow when viewed through edge) |
| 6 | 9.86 | 30 min | 0.51 | — | Film: yellow, very brittle |
| 7 | 9.98 | 1 h | 0.41 | 73.09 | Film: clear, colorless (yellow when viewed through edge) |
| 8 | 10.02 | 1 h | 0.47 | — | Film: clear, yellow, very brittle |
| 9 | 9.64 | 2 h | 0.42 | 73.71 | Film: clear, colorless (yellow when viewed through edge), brittle |
| 10 | 10.40 | 2½ h | 0.42 | 75.50 | Film: clear, colorless (yellow when viewed through edge), brittle |
| 11 | 10.40 | 3 h | 0.40 | 76.23 | Film: clear, yellow |

As shown above, for the level of GMA and TEA chosen in sample 1, a film-forming polymerization does not occur after 15 minutes of heating but as seen in #2 at least about 30 minutes is needed. The color but not clarity appears to be a sensitive function of the level of GMA, TEA and the heating time.

The following example shows the effect of added comonomer on the physical properties, especially water content, of GMA modified PVA. The samples are prepared in a similar manner to Example 1 except that methyl methacrylate (MMA) is added to the reaction mixture just prior to the addition of BME.

As shown above, as the proportion of the added comonomer (MMA) is increased the corresponding water content decreases.

The following example shows an alternate method to form an ether-linked PVA using an ethoxylated PVA (EO-PVA) derivative. The solutions are prepared in a similar manner to that in Example 1 except that 1.5 g ethoxylated PVA (Polyscience, MW 175,000 made using 10 mole ethylene oxide to 1 mole vinyl alcohol of a 99% hydrolyzed PVA) is dissolved in 13.5 g DMSO at 70° C. under N with stirring, cooled to room temperature (RT) and 20 (482 μl), 3 (72.4 μl), or 1 (24.1 μl) mole % IEM (assuming 100% hydroxyethylated) is added with rapid stirring. This solution is either reacted at RT overnight or with the addition of 0.0024 g sodium acetate trihydrate at RT for 1 to 3 hours.

The IEM reacted ethoxylated PVA in DMSO is mixed with or without comonomer and 0.05% initiator (i.e. benzoin methyl ether, BME), poured into molds and polymerized with UV light for 1 hour at RT. The polymerized films are removed from the molds and extracted in distilled water. They are boiled for 10 minutes before water contents are done. Note: samples 1-4 are reacted with sodium acetate for 3 hours and samples 5 and 6 are reacted for 1 hour.

EXAMPLE 5

| Sample # | Mole % GMA | % MMA | % TEA | % H$_2$O Content | Observation After Irradiation Water Equilibration & Boiling |
|---|---|---|---|---|---|
| 1 | 10.09 | 0 | 0.28 | 71.92 | Film: clear, yellow, brittle |
| 2 | 9.65 | 9.85 | 0.23 | 60.79 | Film: clear, yellow, brittle |
| 3 | 10.03 | 15.74 | 0.19 | 57.17 | Film: clear, colorless (yellow when viewed through edge) |
| 4 | 9.68 | 20.74 | 0.20 | 54.88 | Film: clear, colorless (yellow when viewed through edge) |

EXAMPLE 6

| Sample # | Mole % IEM | % EO-PVA | % Comonomer | % BME | $H_2O$ (After Boiling) | Clarity (After Boiling) |
|---|---|---|---|---|---|---|
| 1 | 1 | 100 | — | 0.05 | 98.83 | clear |
| 2 | 1 | 49.7 | 50.3 MMA | 0.06 | 93.37 | cloudy |
| 3 | 1 | 33.4 | 66.6 MMA | 0.05 | 90.61 | cloudy |
| 4 | 1 | 24.7 | 75.3 MMA | 0.05 | 88.84 | opaque |
| 5 | 3 | 100 | — | 0.05 | 93.30 | clear |
| 6 | 3 | 75.1 | 24.9 MMA | 0.05 | 89.43 | clear |
| 7 | 20 | 100 | — | 0.05 | 76.84 | clear |
| 8 | 20 | 35.4 | 64.6 HEMA | 0.05 | 54.64 | clear |
| 9 | 20 | 35.1 | 64.9 DMA | 0.05 | 77.58 | clear |

MMA = methyl methacrylate
DMA = dimethyl acrylamide
HEMA = hydroxyethyl methacrylate As shown above, clear (and wettable) films can be made using a derivatized PVA with or without added comonomer. Only at very high levels of MMA are the films not clear.

The following example illustrates a procedure for avoiding the yellowing that is sometimes observed in ether-linked PVA films.

EXAMPLE 7

A 10% solution of Vinol ® 107 in DMSO is modified with 10 mole % GMA (0.2% by weight TEA catalyst) by heating at 60° C. for 3 hours in a similar manner as shown in Example 1. This solution turns yellow while heating. Precipitation of the GMA modified PVA in isopropanol and redissolution in DMSO results in a disappearance of the yellow color.

EXAMPLE 8

Several lenses are fabricated in contact lens molds made from polypropylene. The reaction solutions are made as in Example 1 both with and without MMA (13.5% by weight with respect to PVA), 10 mole % GMA, 0.2% by weight TEA and BME (0.13% without MMA, 0.17% with MMA). These solutions are pipetted into the lens molds and are UV cured for 4 hours After water extraction, boiling and equilibration in water the lenses come out optically clear with no obvious difference in strength or swelling relative to a sheet made of a similar composition.

What is claimed is:

1. A contact lens which is the crosslinked, substantially transparent copolymerization product of
   (a) a derivative of poly(vinyl alcohol), having a weight average molecular weight of at least 2000, wherein between 0.1 and 90 percent of the total number of hydroxyl groups on said poly(vinyl alcohol) are reacted to give a repeating structural unit of formula I

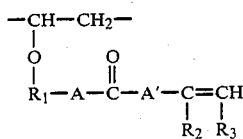

(I)

wherein
$R_1$ is a straight or branched chain alkylene of 1 to 20 carbon atoms, or a straight or branched chain alkylene of 2 to about 100 carbon atoms interrupted by one or more carbonyloxy, sulfonamido, carbonamido, sulfonyl or oxy groups, $R_1$ being unsubstituted or further substituted by hydroxy, A is —O—, —NH— or —NHCONR"— where R" is hydrogen or lower alky, and A' is a direct bond, or A is a direct bond and A' is —O— or —O—$CH_2$—, $R_2$ is hydrogen or methyl, and $R_3$ is hydrogen, methyl or —$COOR_4$ where $R_4$ is hydrogen or lower alkyl with the proviso that when $R_2$ is methyl, $R_3$ is hydrogen; and (b) a polymerizable vinyl monomer wherein for each repeating structural unit of formula I there are from 0.01 to 80 units of said polymerizable vinyl monomer with the proviso that at least 50% by weight of the polymerizable vinyl monomer is a hydrophobic vinyl monomer.

2. A contact lens according to claim 1, wherein $R_1$ is alkylene of 2 to 10 carbon atoms which is unsubstituted or substituted by hydroxy.

3. A contact lens according to claim 1, wherein the polyvinyl alcohol has a weight average molecular weight of at least 10,000.

4. A contact lens according to claim 1 wherein formula I, $R_1$ is —$CH_2CHOHCH_2$—, A is —O—, A' is a direct bond, $R_2$ is methyl and $R_3$ is hydrogen.

5. A contact lens according to claim 1 where in formula I $R_1$ is —$R^a$—O— ($R^b$—O)$_n$—$R^c$—O—CONH—$CH_2CH_2$— where $R^a$ and $R^c$ are independently alkylene of 2 to 8 carbon atoms, $R^b$ is alkylene of 2 to 4 carbon atoms, and n is 1 to 20.

6. A contact lens according to claim 5 wherein $R^a$, $R^b$ and $R^c$ are each ethylene.

7. A contact lens according to claim 5 wherein A is —O—, A' is a direct bond, $R_2$ is methyl and $R_3$ is hydrogen.

8. A contact lens according to claim 1 where in formula I $R_1$ is —$CH_2CHOHCH_2$—, A is —O—, A' is a direct bond, $R_2$ is methyl and $R_3$ is hydrogen, and wherein the polymerizable vinyl monomer is methyl methacrylate.

9. A contact lens according to claim 1 wherein between about 0.1 to about 20 percent of the total number of hydroxyl groups on the poly(vinyl alcohol) are reached to give a repeating structural unit of formula I.

* * * * *